US011018834B2

(12) United States Patent
Li et al.

(10) Patent No.: US 11,018,834 B2
(45) Date of Patent: May 25, 2021

(54) OPPORTUNISTIC RETRANSMISSION SCHEME BASED ON DYNAMIC REASSIGNMENT OF DOWNLINK RESOURCES

(71) Applicant: QUALCOMM Incorporated, San Diego, CA (US)

(72) Inventors: Chong Li, Weehawken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/407,585

(22) Filed: May 9, 2019

(65) Prior Publication Data

US 2019/0372739 A1 Dec. 5, 2019

Related U.S. Application Data

(60) Provisional application No. 62/680,981, filed on Jun. 5, 2018.

(51) Int. Cl.
*H04L 5/00* (2006.01)
*H04L 1/16* (2006.01)
*H04W 72/12* (2009.01)

(52) U.S. Cl.
CPC .......... *H04L 5/0055* (2013.01); *H04L 1/1621* (2013.01); *H04L 1/1657* (2013.01); *H04W 72/121* (2013.01)

(58) Field of Classification Search
CPC ... H04L 5/0055; H04L 1/1657; H04L 1/1621; H04L 5/0048; H04L 5/0035;

(Continued)

(56) References Cited

U.S. PATENT DOCUMENTS

2002/0007492 A1* 1/2002 Smyth .................. H04N 17/004
725/107
2008/0310361 A1* 12/2008 Cho ...................... H04L 5/0078
370/329

(Continued)

OTHER PUBLICATIONS

International Search Report and Written Opinion—PCT/US2019/031845—ISA/EPO—dated Aug. 6, 2019.

(Continued)

*Primary Examiner* — Thien Nguyen
(74) *Attorney, Agent, or Firm* — Linda G. Gunderson; MG-IP Law, PC

(57) ABSTRACT

In an embodiment, a BS transmits, on a set of resources, a first communication to each of a plurality of UEs. The BS receives ACKs to the transmitted first communications from a first subset of UEs, and determines that a second subset of UEs fails to ACK the transmitted first communication (e.g., via implicit or explicit NACKs). The BS configures a group scheduling message that indicates an allocation of the set of resources to the second subset of UEs (e.g., a different subset of the set of resources being allocated to each UE in the second subset of UEs) based on a predetermined resource reallocation scheme. The BS transmits the group scheduling message to the second subset of UEs, and transmits, on the set of resources, a second communication to each UE in the second subset of UEs in accordance with the indicated allocation from the group scheduling message.

30 Claims, 13 Drawing Sheets

(58) Field of Classification Search
CPC ... H04L 5/0053; H04L 5/0044; H04L 1/1887; H04L 5/0037; H04L 5/0094; H04L 1/1671; H04L 5/0007; H04W 72/121
See application file for complete search history.

(56) References Cited

U.S. PATENT DOCUMENTS

| | | | | |
|---|---|---|---|---|
| 2011/0216809 | A1* | 9/2011 | Gan | H04W 84/20 375/140 |
| 2013/0039297 | A1* | 2/2013 | Wang | H04W 76/25 370/329 |
| 2014/0325301 | A1* | 10/2014 | Gao | H04W 72/042 714/748 |
| 2016/0295557 | A1* | 10/2016 | Azarian Yazdi | H04L 5/001 |
| 2017/0338908 | A1* | 11/2017 | Chebib | H04L 1/18 |
| 2020/0100190 | A1* | 3/2020 | Hoglund | H04W 72/0486 |

OTHER PUBLICATIONS

NTT Docomo et al., "Offline Discussions on Some Topics for AI6.1.3.3.3", 3GPP Draft; R1-1715193, 3rd Generation Partnership Project (3GPP), Mobile Competence Centre, 650, Route Des Lucioles ; F-06921 Sophia-Antipolis Cedex, France, vol. RAN WG1, No. Prague, Czech Republic; Aug. 21, 2017-Aug. 25, 2017, Aug. 26, 2017 (Aug. 26, 2017), pp. 1-23, XP051328673, Retrieved from the Internet: URL: https://www.3gpp.org/ftp/TSG_RAN/WG1_RL1/TSGR1_90/Docs [retrieved on Aug. 26, 2017].
Frotzscher A., et al., "Requirements and current solutions of wireless communication in industrial automation," International Conference on Communications Workshops (ICC), IEEE, 2014, 6 pages.

* cited by examiner

OPPORTUNISTIC RETRANSMISSION SCHEME BASED ON DYNAMIC REASSIGNMENT OF DOWNLINK RESOURCES

CROSS-REFERENCE TO RELATED APPLICATION

The present application for patent claims the benefit of U.S. Provisional Patent Application No. 62/680,981 entitled "OPPORTUNISTIC RETRANSMISSION SCHEME BASED ON DYNAMIC REASSIGNMENT OF DOWNLINK RESOURCES" filed Jun. 5, 2018, pending, and assigned to the assignee hereof and hereby expressly incorporated herein by reference in its entirety.

INTRODUCTION

Aspects of this disclosure relate generally to telecommunications, and more particularly to an opportunistic retransmission scheme based on dynamic reassignment of downlink resources.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3 GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

Additionally, wireless communication systems in factory automation have stringent reliability and latency requirements. Sensor, actuators, control commands and related signals typically need to communicate and work in coordinated fashion where delay or loss of signal could result in a catastrophic system failure. Accordingly, factory automation has additional implementation challenges when designing wireless communication systems.

SUMMARY

An embodiment is directed to a method of operating a base station of a communications network, comprising transmitting, on a set of resources, a first communication to each of a plurality of user equipments (UEs), receiving acknowledgments (ACKs) to the transmitted first communications from a first subset of the plurality of UEs, determining that a second subset of the plurality of UEs has failed to acknowledge the transmitted first communications, configuring a group scheduling message that indicates an allocation of the set of resources to the second subset of UEs based on a predetermined resource reallocation scheme, transmitting the group scheduling message to the second subset of UEs, and transmitting, on the set of resources, a second communication to each UE in the second subset of UEs in accordance with the indicated allocation from the group scheduling message.

Another embodiment is directed to a method of operating a user equipment (UE) of a communications network, comprising receiving, from a base station, a group scheduling message that indicates an allocation of a set of resources to a subset of a plurality of UEs that each failed to acknowledge a respective first communication among a plurality of first communication transmissions from the base station, the indicated allocation of the set of resources being based on a predetermined resource reallocation scheme, determining, from the indicated allocation of the set of resources in the group scheduling message, a subset of the set of resources allocated to the UE, and receiving, from the base station, a second communication on the subset of resources allocated to the UE.

Another embodiment is directed to a base station of a communications network, comprising means for transmitting, on a set of resources, a first communication to each of a plurality of user equipments (UEs), means for receiving acknowledgments (ACKs) to the transmitted first communications from a first subset of the plurality of UEs, means for determining that a second subset of the plurality of UEs has failed to acknowledge the transmitted first communications, means for configuring a group scheduling message that indicates an allocation of the set of resources to the second subset of UEs based on a predetermined resource reallocation scheme, means for transmitting the group scheduling message to the second subset of UEs, and means for transmitting, on the set of resources, a second communication to each UE in the second subset of UEs in accordance with the indicated allocation from the group scheduling message.

Another embodiment is directed to a user equipment (UE) of a communications network, comprising means for receiving, from a base station, a group scheduling message that indicates an allocation of a set of resources to a subset of a plurality of UEs that each failed to acknowledge a respective first communication among a plurality of first communication transmissions from the base station, the indicated allocation of the set of resources being based on a predetermined resource reallocation scheme, means for determining, from the indicated allocation of the set of resources in the group scheduling message, a subset of the set of resources allocated to the UE, and means for receiving, from the base station, a second communication on the subset of resources allocated to the UE.

Another embodiment is directed to a base station of a communications network, comprising a memory, and at least one processor coupled to at least one transceiver and the memory and configured to transmit, on a set of resources, a first communication to each of a plurality of user equipments (UEs), receive acknowledgments (ACKs) to the transmitted first communications from a first subset of the plurality of UEs, determine that a second subset of the plurality of UEs has failed to acknowledge the transmitted first communications, configure a group scheduling message that indicates an allocation of the set of resources to the second subset of UEs based on a predetermined resource reallocation scheme, transmit the group scheduling message to the second subset of UEs, and transmit, on the set of resources, a second communication to each UE in the second subset of UEs in accordance with the identified allocation from the group scheduling message.

Another embodiment is directed to a user equipment (UE) of a communications network, comprising a memory, and at least one processor coupled to at least one transceiver and the memory and configured to receive, from a base station, a group scheduling message that indicates an allocation of a set of resources to a subset of the plurality of UEs that each failed to acknowledge a respective first communication among a plurality of first communication transmissions from the base station, the indicated allocation of the set of resources being based on a predetermined resource reallocation scheme, determine, from the indicated allocation of the set of resources in the group scheduling message, a subset of the set of resources allocated to the UE, and receive, from the base station, a second communication on the subset of resources allocated to the UE.

Another embodiment is directed to a non-transitory computer-readable medium containing instructions stored thereon, which, when executed by a base station of a communications network, cause the base station to perform operations, the instructions comprising at least one instruction to cause the base station to transmit, on a set of resources, a first communication to each of a plurality of user equipments (UEs), at least one instruction to cause the base station to receive acknowledgments (ACKs) to the transmitted first communications from a first subset of the plurality of UEs, at least one instruction to cause the base station to determine that a second subset of the plurality of UEs has failed to acknowledge the transmitted first communications, at least one instruction to cause the base station to configure a group scheduling message that indicates an allocation of the set of resources to the second subset of UEs based on a predetermined resource reallocation scheme, at least one instruction to cause the base station to transmit the group scheduling message to the second subset of UEs, and at least one instruction to cause the base station to transmit, on the set of resources, a second communication to each UE in the second subset of UEs in accordance with the identified allocation from the group scheduling message.

Another embodiment is directed to a non-transitory computer-readable medium containing instructions stored thereon, which, when executed by a user equipment (UE) of a communications network, cause the UE to perform operations, the instructions comprising at least one instruction to cause the UE to receive, from a base station, a group scheduling message that indicates an allocation of a set of resources to a subset of the plurality of UEs that each failed to acknowledge a respective first communication among a plurality of first communication transmissions from the base station, the indicated allocation of the set of resources being based on a predetermined resource reallocation scheme, at least one instruction to cause the UE to determine, from the indicated allocation of the set of resources in the group scheduling message, a subset of the set of resources allocated to the UE, and at least one instruction to cause the UE to receive, from the base station, a second communication on the subset of resources allocated to the UE.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Techniques for opportunistic retransmission based on a dynamic reassignment of downlink resources are disclosed. More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
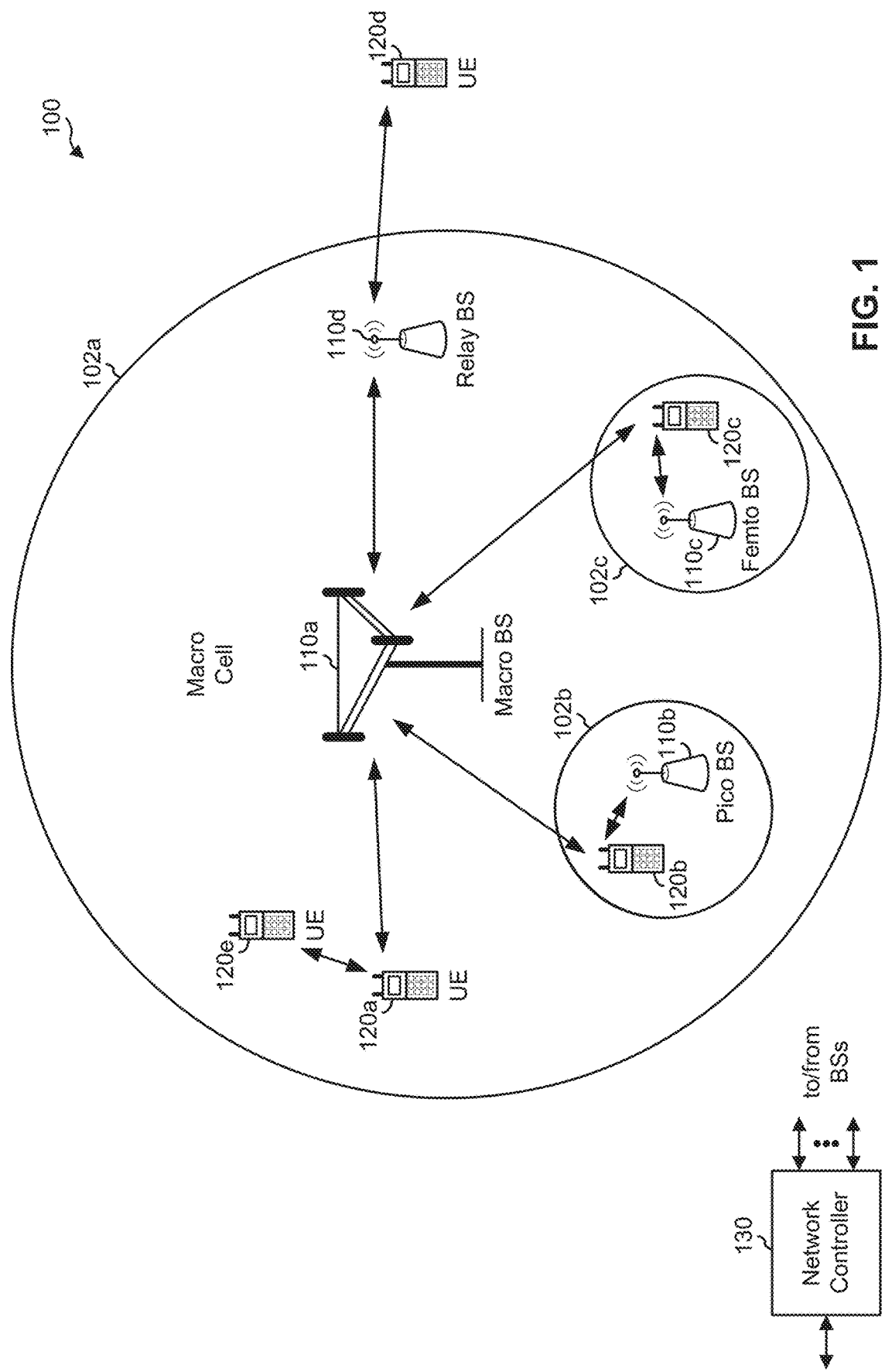
FIG. 1 is a diagram illustrating a network in which aspects of the present disclosure may be practiced.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs 110a-d may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay base station 110d may communicate with macro BS 110a and a UE 120d in order to facilitate communication between macro BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples are possible and may differ from what was described with regard to FIG. 1.

Figure 2:
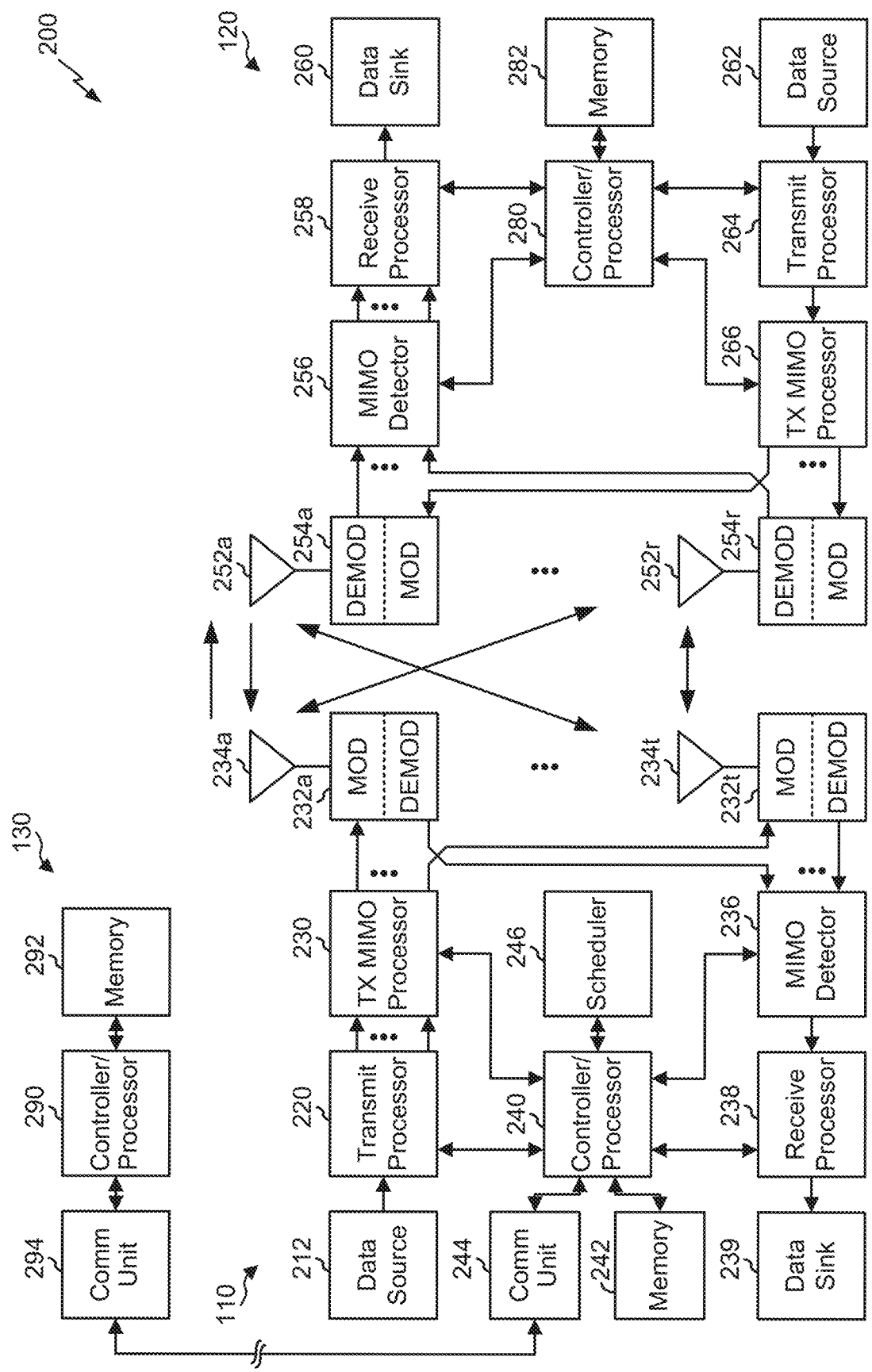
FIG. 2 shows a block diagram of a design of a base station (BS) and a user equipment (UE), according to aspects of the present disclosure.

FIG. 2 shows a block diagram of a system 200 including BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor (e.g., receive processor 258 and/or controller/processor 280) may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with opportunistic retransmission of communications, such as mission-critical communications, as described in more detail elsewhere herein. For example, controller/processor 240 of BS 110, controller/processor 280 of UE 120, and/or any other component(s) of FIG. 2 may perform or direct operations of, for example, processes 1100-1300 of FIGS. 11-13 and/or other processes as described herein. Memories 242 and 282 may store data and program codes for BS 110 and UE 120, respectively. A scheduler 246 may schedule UEs for data transmission on the downlink and/or uplink.

In some aspects, a scheduling entity (e.g., UE 120 and/or BS 110) may include means for performing various actions, in particular, the actions described below with respect to the processes 1100-1300 of FIGS. 11-13. In some aspects, such means may include one or more components of UE 120 and/or one or more components of BS 110 described in connection with FIG. 2.

As indicated above, FIG. 2 is provided merely as an example. Other examples are possible and may differ from what was described with regard to FIG. 2.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission-critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

Figure 3:
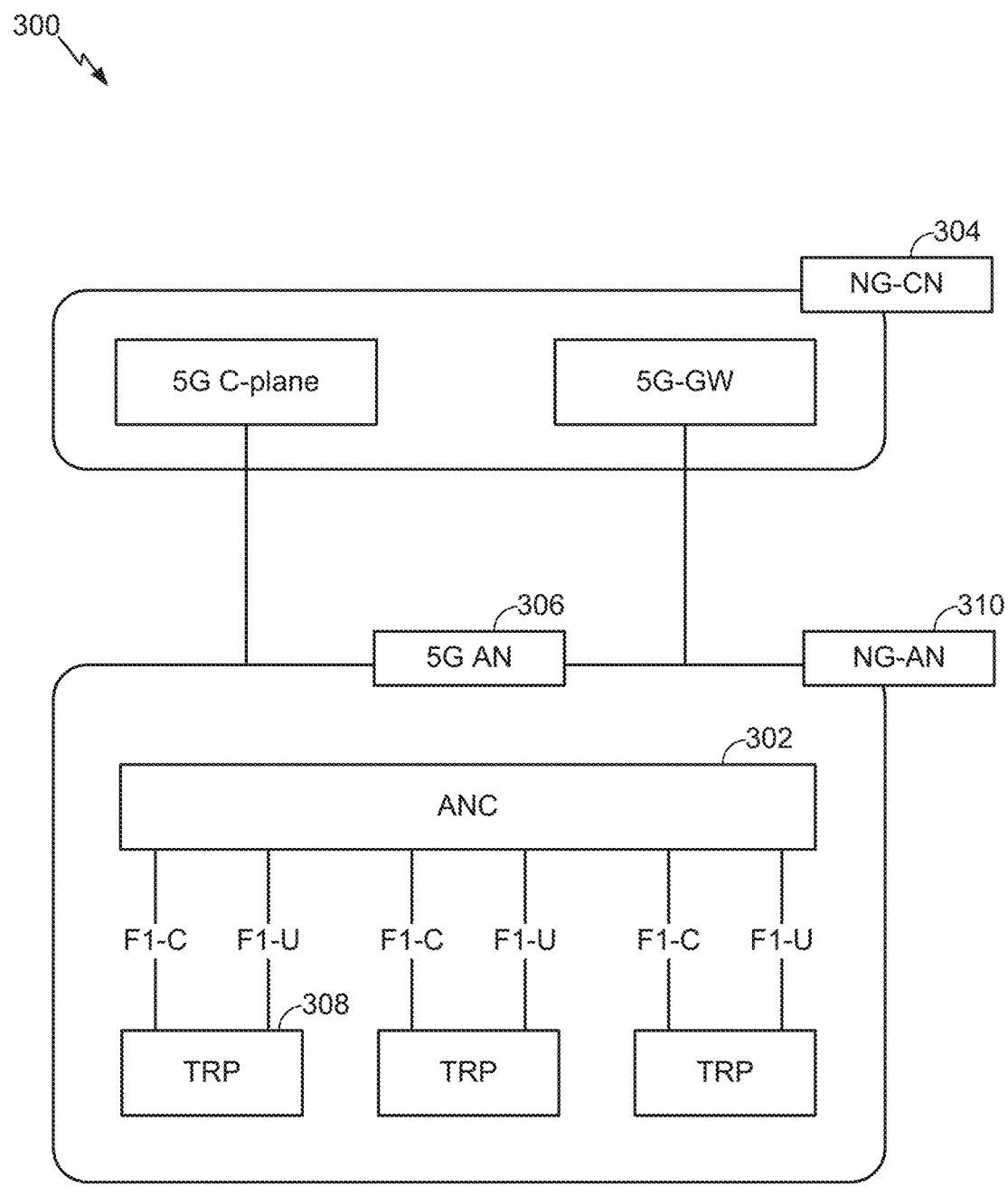
FIG. 3 illustrates an example logical architecture of a distributed radio access network (RAN), according to aspects of the present disclosure.

FIG. 3 illustrates an example logical architecture of a distributed RAN 300, according to aspects of the present disclosure. A 3G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 3G NBs, APs, gNB, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The packet data convergence protocol (PDCP), radio link control (RLC), media access control (MAC) protocol may be adaptably placed at the ANC or TRP.

According to certain aspects, a BS may include a central unit (CU) (e.g., ANC 302) and/or one or more distributed units (e.g., one or more TRPs 308).

As indicated above, FIG. 3 is provided merely as an example. Other examples are possible and may differ from what was described with regard to FIG. 3.

Figure 4:
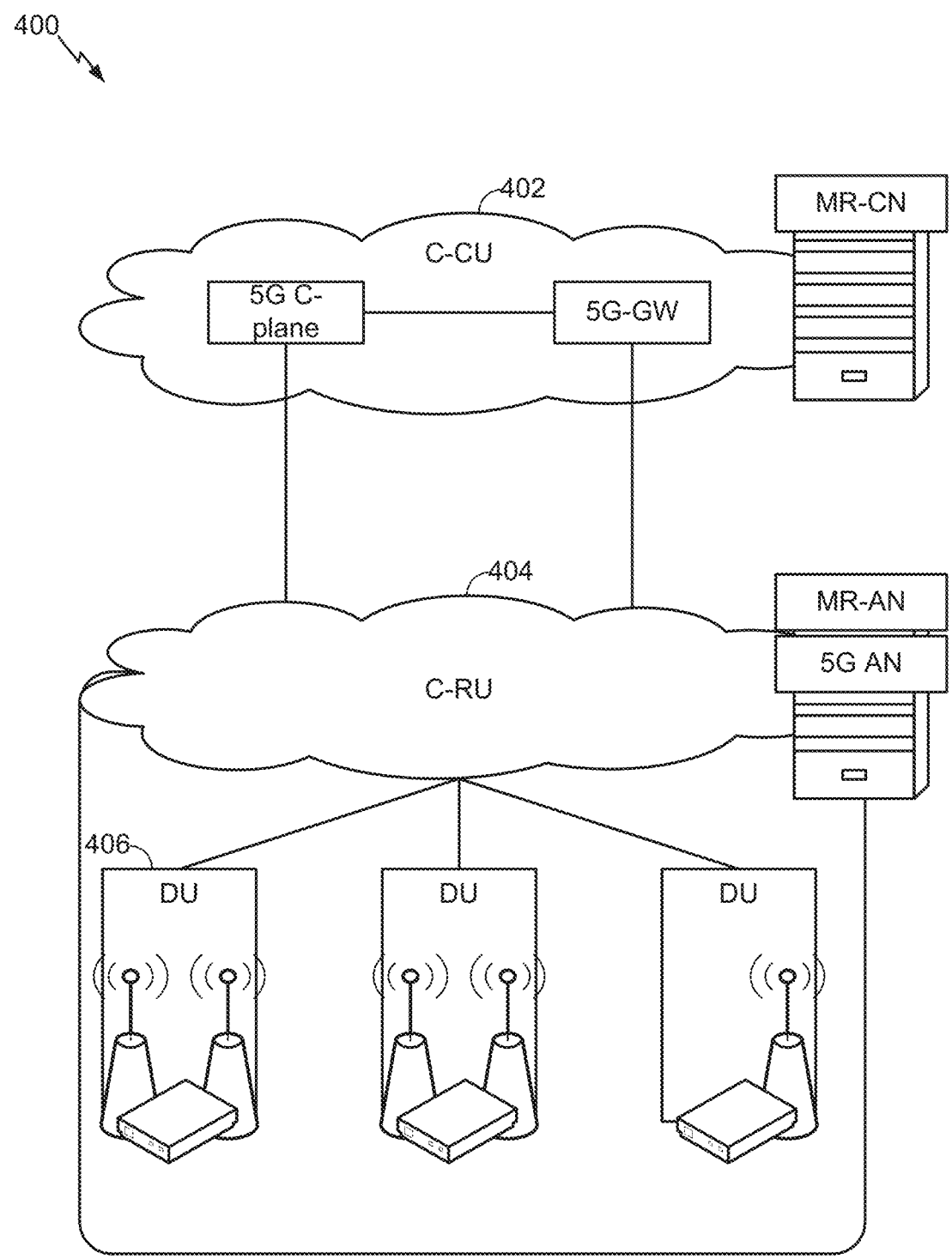
FIG. 4 illustrates an example physical architecture of a distributed RAN, according to aspects of the present disclosure.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity.

A centralized RAN unit (C-RU) 404 may host one or more ANC functions. Optionally, the C-RU may host core network functions locally. The C-RU may have distributed deployment. The C-RU may be closer to the network edge.

A distributed unit (DU) 406 may host one or more TRPs. The DU may be located at edges of the network with radio frequency (RF) functionality.

As indicated above, FIG. 4 is provided merely as an example. Other examples are possible and may differ from what was described with regard to FIG. 4.

Figure 5:
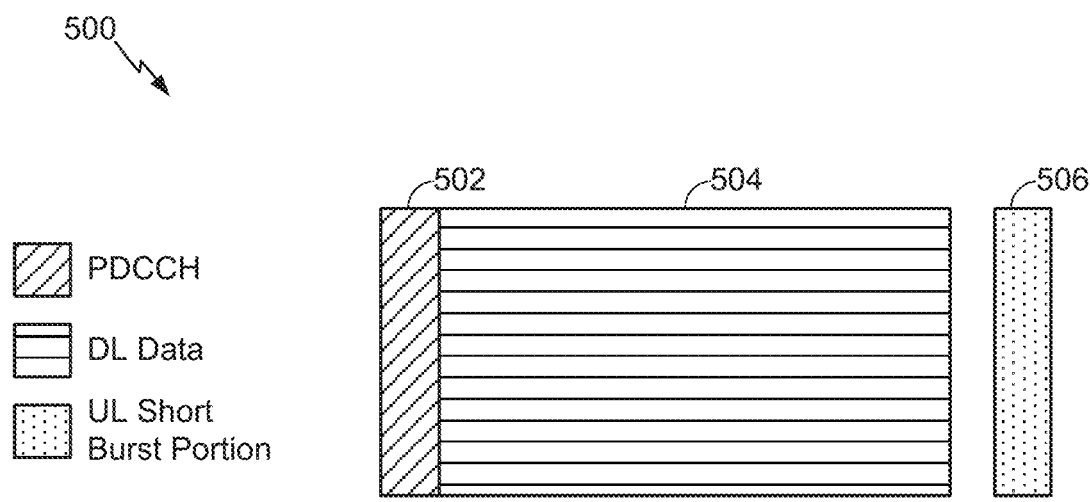
FIG. 5 is a diagram showing an example of a DL-centric subframe or wireless communication structure.

FIG. 5 is a diagram 500 showing an example of a DL-centric subframe or wireless communication structure. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric subframe. For example, the UL short burst portion 506 may include feedback information corresponding to the control portion 502 and/or the data portion 504. Non-limiting examples of information that may be included in the UL short burst portion 506 include an acknowledgment (ACK) signal (e.g., a physical uplink control channel (PUCCH) ACK, a physical uplink shared channel (PUSCH) ACK, an immediate ACK), a negative acknowledgment (NACK) signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples are possible and may differ from what was described with regard to FIG. 5.

Figure 6:
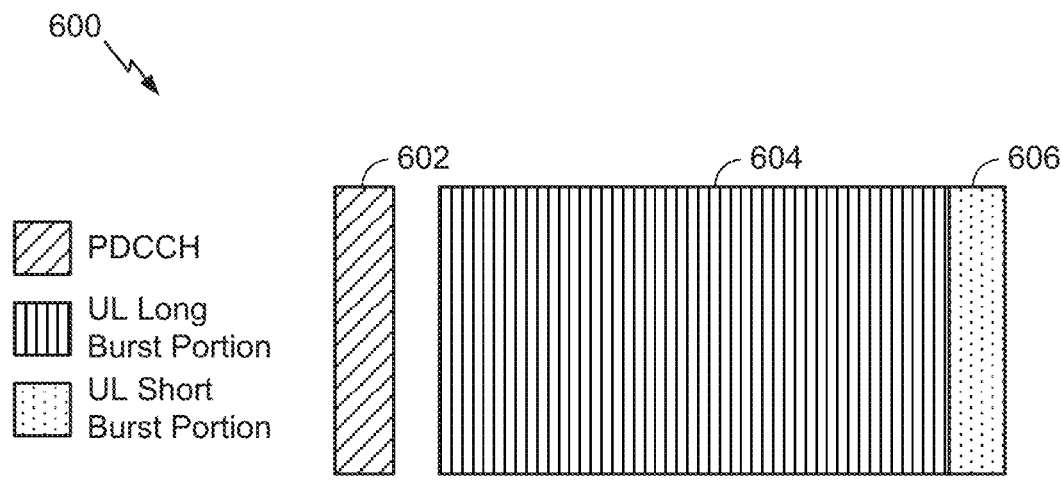
FIG. 6 is a diagram showing an example of an UL-centric subframe or wireless communication structure.

FIG. 6 is a diagram 600 showing an example of an UL-centric subframe or wireless communication structure. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL long burst portion 604. The UL long burst portion 604 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 6 is provided merely as an example. Other examples are possible and may differ from what was described with regard to FIG. 6.

Some wireless communications may be associated with stringent latency and/or reliability requirements. As one example, factory automation services may use wireless communications, and, in some aspects, may have latency requirements in the range of 1 to 10 ms and reliability requirements in the range of 10e-5 to 10e-9. Mission-critical traffic for factory automation may tend to be periodic, and may include cyclic exchanges among programmable logic controllers (PLCs) and sensors and/or actuators (S/A). In some aspects, the PLC (or a base station or UE associated with the PLC) may act as a scheduling entity for the S/As. In such a case, the PLC may function as a master and the S/As may function as slaves.

Figure 7A:
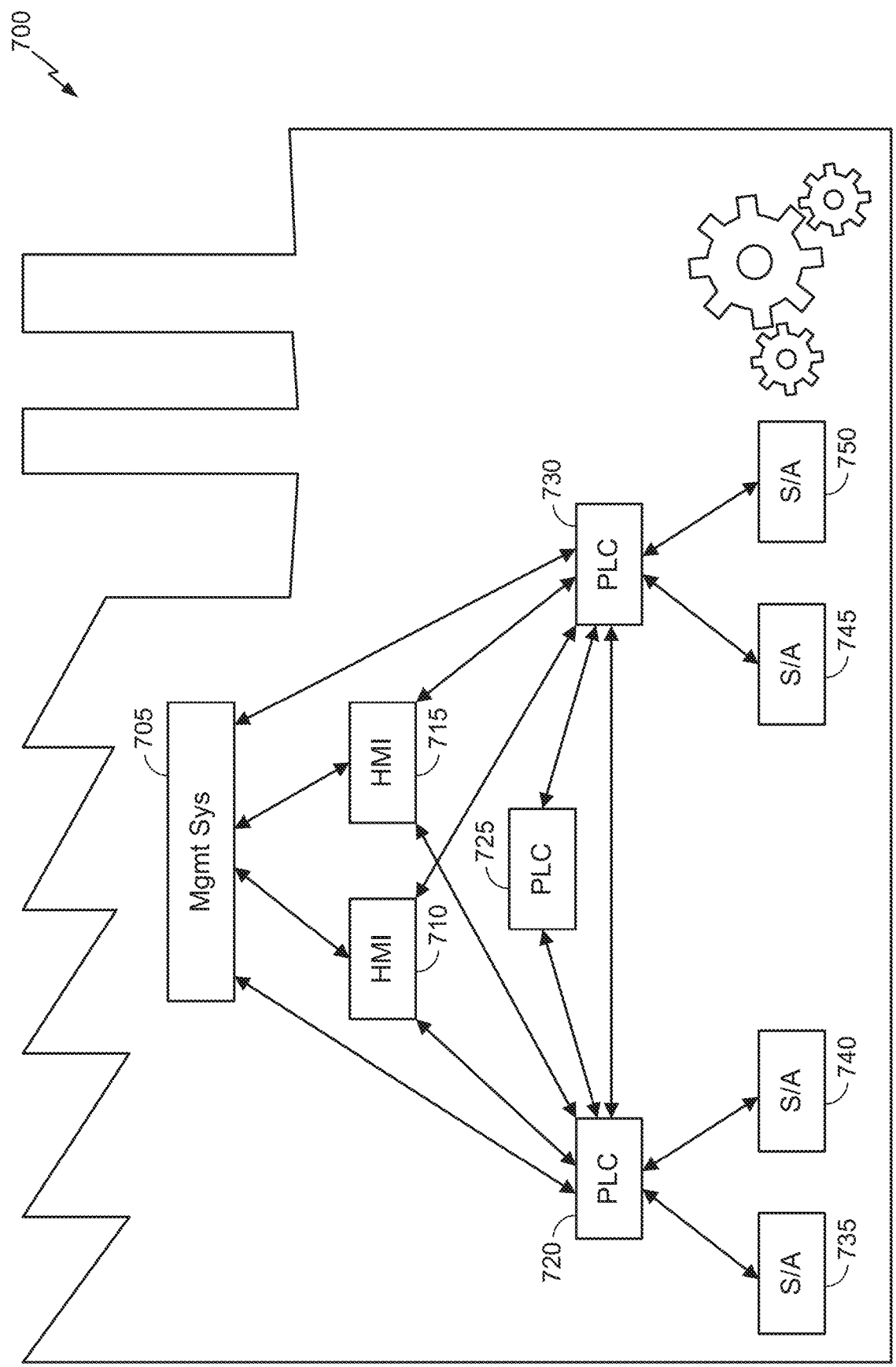
FIG. 7A illustrates a Coordinated Multipoint (CoMP) network in accordance with an embodiment of the disclosure.

FIG. 7A illustrates a Coordinated Multipoint (CoMP) network 700 in accordance with an embodiment of the disclosure. In particular, the CoMP network 700 of FIG. 7A represents an example of an industrial IoT network (e.g., for monitoring and/or controlling various devices or sensors deployed in a factory setting). In an example, wireless communication may be implemented in the CoMP network 700 may be implemented in accordance with a wireless communications protocol, including but not limited to Wireless Speaker & Audio Association (WISA) based on an IEEE 802.15.1 (Bluetooth) PHY with a modified MAC layer (e.g., up to 15 ms latency with 10e-9 reliability), Wireless Highway Addressable Remote Transducer Protocol (WirelessHART) based on IEEE 802.15.4 (ZigBee) PHY/MAC (e.g., for factory automation with low-power sensors), or 5G URLLC Rel. 15 based on a mini-slot structure with URLLC-specific signaling (e.g., sPDCCH, SR, Indicator, etc.).

Referring to FIG. 7A, the CoMP network 700 includes a management system 705, human machine interfaces (HMIs) 710-715, programmable logic controllers (PLCs) 720-730 and sensor/actuators (S/As) 735-750. In FIG. 7A, the various interconnections (or arrows) between the various CoMP network components may correspond to wired or wireless communications interfaces.

Referring to FIG. 7A, the management system 705 includes controller programming, manages software and security for the CoMP network 700, and performs long-term key performance indicator (KPI) monitoring. The HMIs 710-715 include user devices (e.g., tablet computers, panels, wearable computers, etc.). For example, the HMIs 710-715 may permit machine control by authorized personnel at the factory floor (e.g., Start/Stop certain machinery, change a mode of a particular machine from 'widget 1' to 'widget 2', etc.). The HMIs 710-715 may optionally provide an augmented reality (AR) user interface or a virtual reality (VR) user interface.

Referring to FIG. 7A, the PLCs 720-730 may communicate with the S/As 735-750. For example, the PLCs 720-730 may include custom hardware and may issue commands (e.g., motion control) to the S/As 735-750, and may receive sensor inputs (e.g., position data, etc.) from the S/As 735-750 in real-time. The various PLCs 720-730 may also coordinate with each other with respect to S/A control. In an example, the S/As 735-750 may include rotary motors, linear servomotors and/or position sensors.

Table 1 (below) depicts example PLC communication parameters for the CoMP network 700:

TABLE 1

Example PLC Communication Parameters

| Parameter | PLC to S/A | Inter PLC | PLC to Higher Entities |
|---|---|---|---|
| RTT | 0.5 to 10 ms | 4-10 ms | Similar to enhanced mobile broadband (eMBB) use cases (file download, HTML) and also extends to AR/VR |
| Packet Error Rate (PER) Target | 10e-6 | 10e-6 | |
| Packet Size | 40-256 bytes | 1k bytes | |
| Communication Range (cell size) | Maximum: 100 m Typical: 10-15 m | Typical: 100 m | |

In a particular example, traffic between the PLCs 720-720 and the S/As 735-750 may include mission-critical traffic and non-critical traffic. Most mission-critical traffic occurs periodically, whereas non-critical traffic generally occurs aperiodically. In a particular factory example, a network of distributed PLCs may define between 100-1000 cells (e.g., scalable based on a size of the factory) with a cell size of 10×10×3m, with each cell supporting 20-50 nodes (e.g., S/As, HMIs, etc.).

Referring to FIG. 7A, the CoMP network 700 may correspond to an example implementation of the RAT system 100 of FIG. 1, whereby the S/As 735-750 and HMIS 710-715 are example implementations of the UE 120 and the PLCs 720-730 are example implementations of the BS 110 of the RAT system 100 of FIG. 1.

As noted above, certain mission-critical traffic between the PLCs 720-730 and the S/As 735-750 may reliably occur on a periodic basis. For example, the S/As 735-750 may periodically report mission-critical sensor feedback to the PLCs 720-730, and the PLCs 720-730 may periodically transmit mission-critical control data to the S/As 735-750.

Figure 7B:
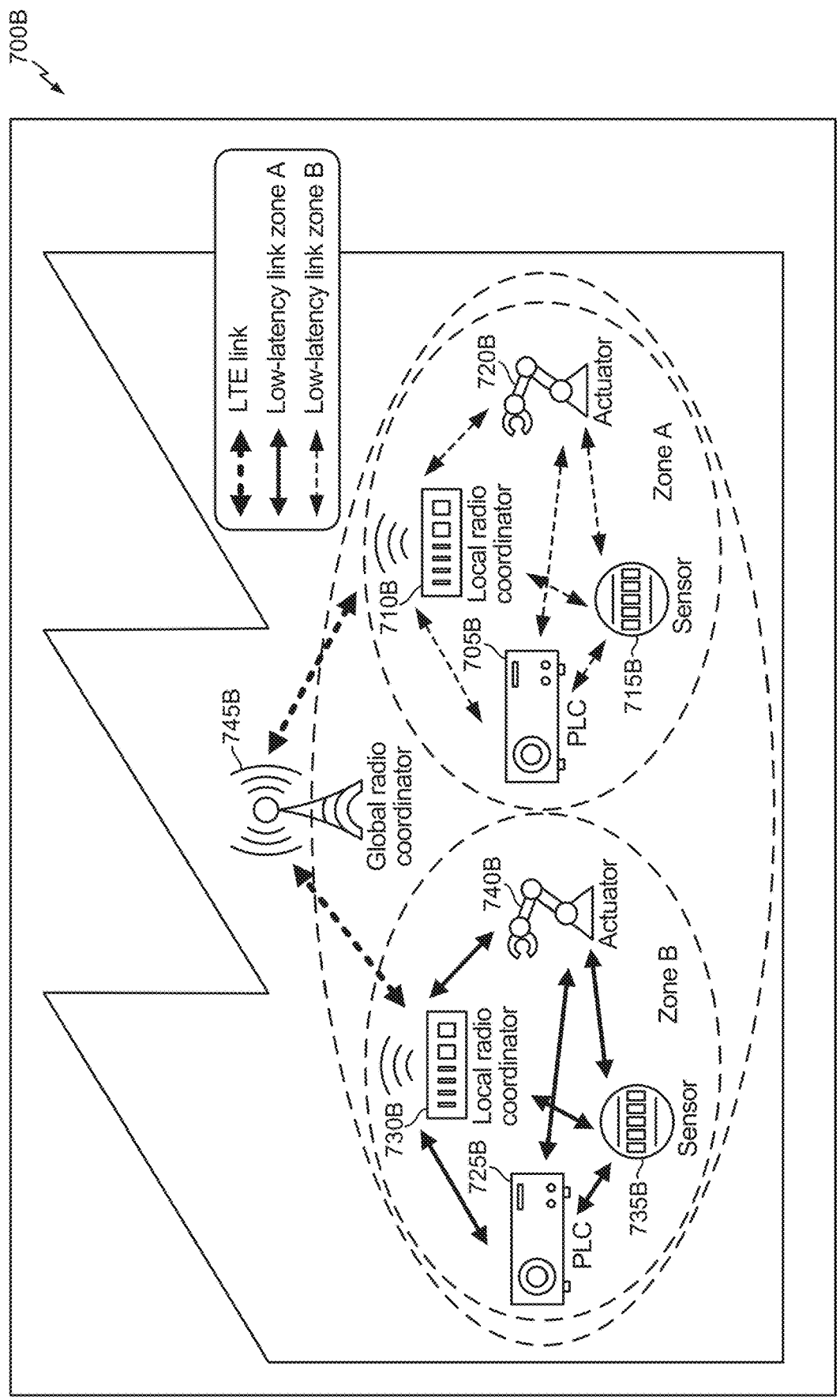
FIG. 7B illustrates a CoMP network in accordance with another embodiment of the disclosure.

FIG. 7B illustrates a CoMP network 700B in accordance with another embodiment of the disclosure. In particular, the CoMP network 700B illustrates a more detailed implementation example of the CoMP network 700 of FIG. 7A.

Referring to FIG. 7B, a first zone ("Zone A") includes a PLC 705B, a local radio coordinator 710B, and S/As 715B-720B and a second zone ("Zone B") includes a PLC 725B, a local radio coordinator 730B, and S/As 735B-740B. Each of the local radio coordinators 710B-730B is communicatively coupled to a global radio coordinator 745B via an LTE link. Inside each zone, the various communication devices communicate wirelessly via respective low-latency wireless communication links (e.g., Bluetooth, ZigBee, URLLC, etc.). In an example, the local radio coordinators 710B-730B and global radio coordinator 745B may collectively correspond to the management system 705 in FIG. 7A.

Figure 8B:
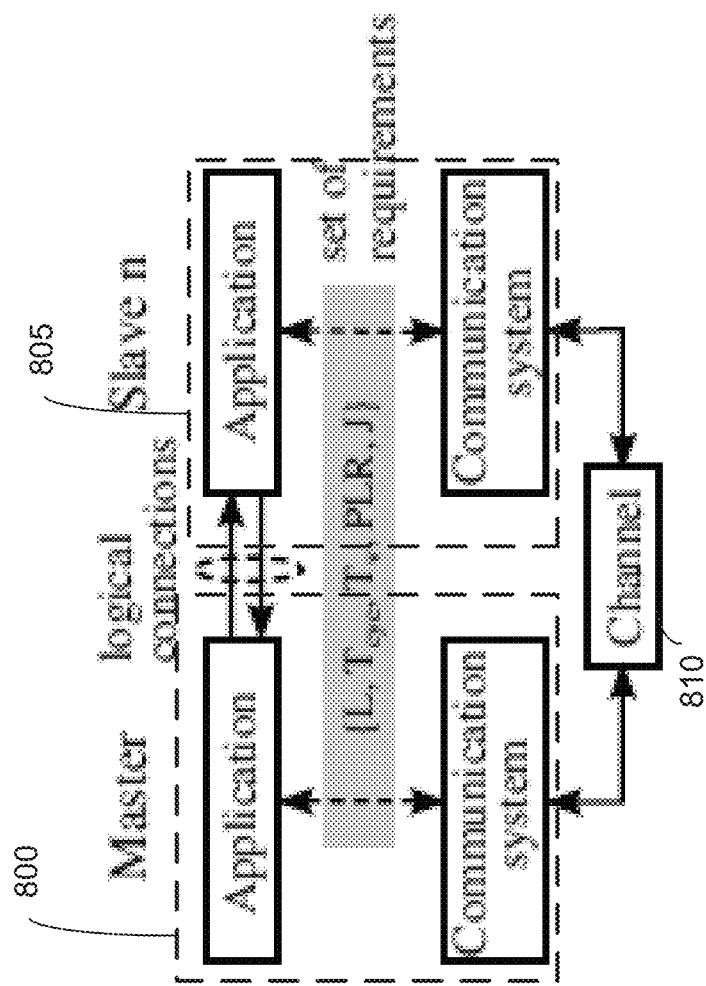
FIG. 8B illustrates logical connections of a physical channel for the communications shown in FIG. 8A in accordance with an embodiment of the disclosure.
Figure 8A:
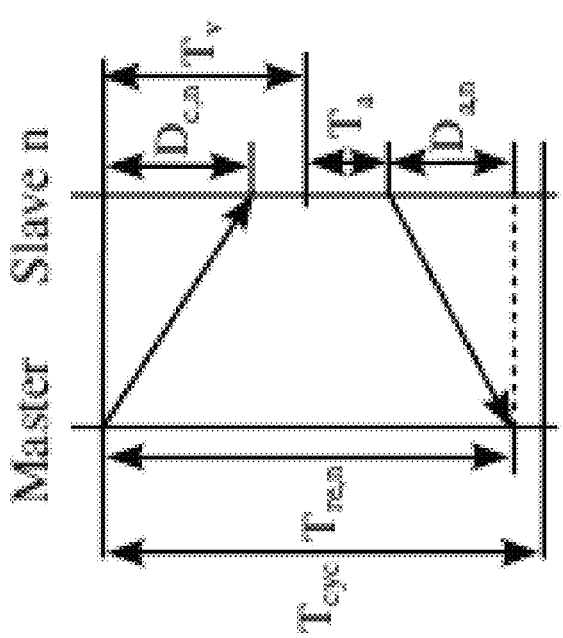
FIG. 8A illustrates a timing diagram for communications between a master device and N slave devices in accordance with an embodiment of the disclosure.

FIG. 8A illustrates a timing diagram for communications between a master device and N slave devices in accordance with an embodiment of the disclosure. FIG. 8B illustrates logical connections of a physical channel for the communications shown in FIG. 8A in accordance with an embodiment of the disclosure. In an example, the master device may correspond to one of the PLCs described above with respect to FIGS. 7A-7B, and the N slave devices may each correspond to one of the S/As described above with respect to FIGS. 7A-7B. In FIG. 8B, the master device (denoted as master device 800) includes an application that is logically connected to a slave device (denoted as slave device 805), whereby the end-to-end communication over a physical channel 810 is required to satisfy certain master-slave communication parameters (denoted as L, $T_{cyc}$, $T_v$, PLR and J).

Referring to FIGS. 8A-8B, the master device and N slave devices may communicate with each other in cycles (referred to herein as traffic cycles), whereby $T_{cyc}$ denotes the traffic cycle duration. Generally, the master device sends commands at the beginning of each traffic cycle (e.g., in a window of time denoted as $T_v$), and the N slave devices respond back to the master device (e.g., with measurements, etc.) before the end of the traffic cycle.

Table 2 (below) depicts example master-slave communication parameters between a master device and various types of slave devices:

TABLE 2

Example Master-Slave Communication Parameters

| Example | N | L [Byte] | $T_{cyc}$ [ms] | $T_v$ [ms] | J [µs] |
|---|---|---|---|---|---|
| Manufacturing cell [12] | 30 | <16 | 50 | 5 | 500 |
| Sensor-actuator [3] | 120 | <20 | n.s. | 15 | n.s. |

TABLE 2-continued

Example Master-Slave Communication Parameters

| Example | N | L [Byte] | $T_{cyc}$ [ms] | $T_v$ [ms] | J [µs] |
|---|---|---|---|---|---|
| Closed-loop control [15] | high | low | n.s. | 1 | 20 |
| Machine Tools | 20 | 50 | 0.5 | 0.25 | 1 |
| Printing Machines | 50 | 30 | 2 | 1 | 5 |
| Packaging Machines | 30 | 15 | 5 | 2.5 | 20 |

Various issues may arise with certain publicly available solutions for mission-critical communications, for example, in the factory automation space. For example, existing solutions may use the crowded unlicensed band, leading to unpredictable interference, limited transmission power, and stringent listen-before-talk requirements. Other solutions may emphasize energy efficiency at the cost of unacceptable latency. One solution, which uses current 3GPP agreements, carries heavy control signaling overhead, a reliability target of 10e-4 to 10e-5, and is currently usable only in frequency division duplexing (FDD). Furthermore, such a solution may use a grant-free approach, which may lead to collisions in dense deployments, such as factory floors.

Some techniques and apparatuses described herein provide opportunistic reassignment of persistent resource allocations for communications, such as mission-critical communications. For example, some techniques and apparatuses described herein provide low latency and high reliability for communications using limited control signaling (e.g., without initial scheduling using a PDCCH) in FDD or TDD, overprovisioning to improve reliability, and an acknowledgment/negative acknowledgment procedure to indicate success or failure of an overprovisioned communication. In this way, a reliable, low-latency wireless communication structure can be achieved for mission-critical communications, such as factory automation communications.

Figure 9:
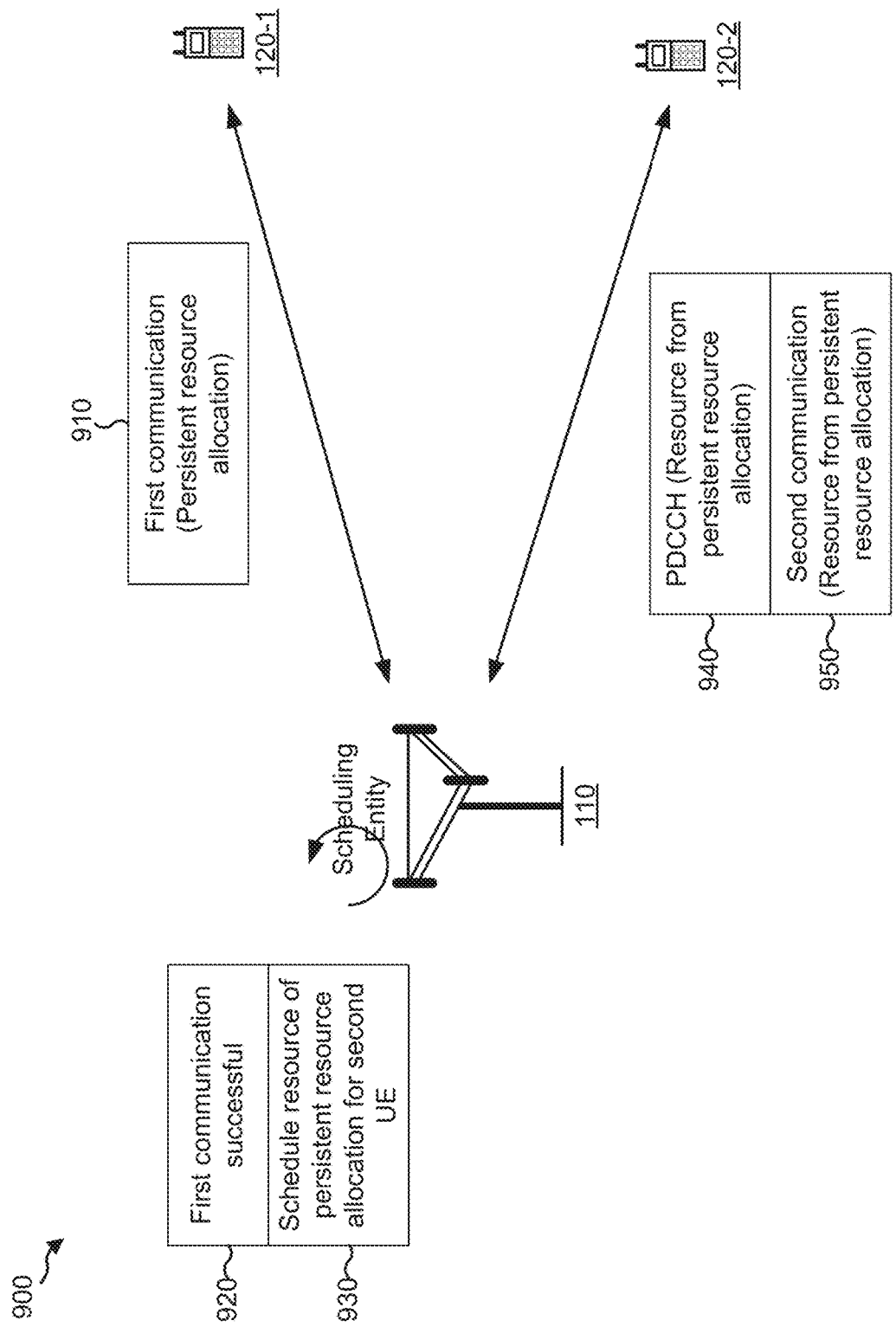
FIG. 9 is a diagram illustrating an example of opportunistic retransmission of mission-critical communications, in accordance with various aspects of the present disclosure.

FIG. 9 is a diagram illustrating an example 900 of opportunistic retransmission of mission-critical communications, in accordance with various aspects of the present disclosure. FIG. 9 shows a BS 110, which is a scheduling entity for a UE 120-1 and a UE 120-2. However, in some aspects, a UE may be a scheduling entity for one or more other UEs 120.

As shown in FIG. 9, and by reference number 910, the UE 120-1 may perform a first communication with the BS 110 based at least in part on a persistent resource allocation. As used herein, persistent resource allocation may be implemented via any well-known semi-persistent scheduling (SPS) protocol. For example, the first communication may be an uplink communication and/or a downlink communication. The persistent resource allocation may identify repeating resources in which the first communication is to be performed. In some aspects, the repeating resources may be in a single channel, although other implementations are possible (e.g., different channels, frequency hopping, etc.). In some aspects, the first communication may be a first transmission or reception, and one or more additional resources in a subsequent channel may be allocated for the first communication. When the first transmission or reception of the first communication is successful, the one or more additional resources may be used for other communications, as described below. When the first transmission or reception is unsuccessful, a second transmission or reception (e.g., a repetition) of the first communication may be performed in the one or more additional resources. For a more detailed description of the persistent resource allocation, refer to the description of FIG. 10, below.

In some aspects, the UE 120-2 may be associated with another persistent resource allocation. For example, UEs 120-1 and 120-2 may be associated with respective resource allocations, which reduces collision of communications of UEs 120-1 and 120-2 with each other or communications of other UEs 120. In some aspects, the techniques described herein may be applied in dense deployments of, for example, tens of UEs, hundreds of UEs, and/or the like. In this way, the persistent resource allocation increases a practical limit on the number of UEs that can be deployed in an area. In some aspects, the persistent resource allocations may be pre-configured or predefined before the operations described in connection with FIG. 9. For example, the persistent resource allocations may not be provided to the UE 120-1 and 120-2 using physical downlink control channels as the communications are performed, which improves reliability and reduces messaging overhead of the BS 110.

As shown by reference number 920, the BS 110 may determine that the first communication is successful. When the first communication is a downlink communication, the BS 110 may determine that the first communication is successful based at least in part on receiving an ACK from the UE 120-1. When the first communication is an uplink communication, the BS 110 may determine that the first communication is successful based at least in part on decoding the first communication, and may provide an ACK to the UE 120-1. In some aspects, the BS 110 may determine that the first communication is successful after two or more repetitions of the first communication. For example, the UE 120 or BS 110 may combine the two or more repetitions until a successful result is reached, and may provide an ACK after the successful result is reached.

As shown by reference number 930, the BS 110 may schedule a resource of the persistent resource allocation of the UE 120-1 for a second UE (e.g., UE 120-2). In this way, subsequent resources of the persistent resource allocation are not wasted after the first communication is successfully decoded. In some aspects, the BS 110 may select a UE or a communication to receive the resource. For example, in a situation wherein the BS 110 is a scheduling entity for many UEs 120 (i.e., greater than a threshold number of UEs 120), the BS 110 may select a UE 120 and/or a communication of the UE 120 for which the resource is to be reassigned (e.g., based at least in part on a UE-specific priority or a communication-specific priority, such as a communication with a highest number of unsuccessful attempts, etc.).

As shown by reference number 940, the BS 110 may provide a downlink control channel, such as a physical downlink control channel (PDCCH), to the UE 120-2. The PDCCH may include a grant for the resource from the persistent resource allocation of the UE 120-1. In this way, the resource is reallocated from the persistent resource allocation based at least in part on a need of another UE. In some aspects, the resource from the persistent resource allocation of the UE 120-1 may be frequency hopped when reassigned to the UE 120-2. This may improve frequency diversity of the second communication.

As shown by reference number 950, the UE 120-2 may perform a second communication using the resource from the persistent resource allocation. In some aspects, the second communication may be an uplink communication and/or a downlink communication. In some aspects, the UE 120-2 may perform the second communication using the resource in addition to, or alternatively to, performing the second communication using a resource of a persistent resource allocation of the UE 120-2. In this way, resilience of the second communication is improved.

In some aspects, the first communication and/or the second communication may include mission-critical traffic. For example, the first communication and/or the second communication may include cyclical data for a factory automation environment. Therefore, the dynamic reallocation of resources of persistent resource allocations for the first communication and the second communication may be particularly beneficial (e.g., since the cyclical nature of the communications improves predictability of the communications).

As indicated above, FIG. 9 is provided as an example. Other examples are possible and may differ from what was described with respect to FIG. 9.

Figure 10:
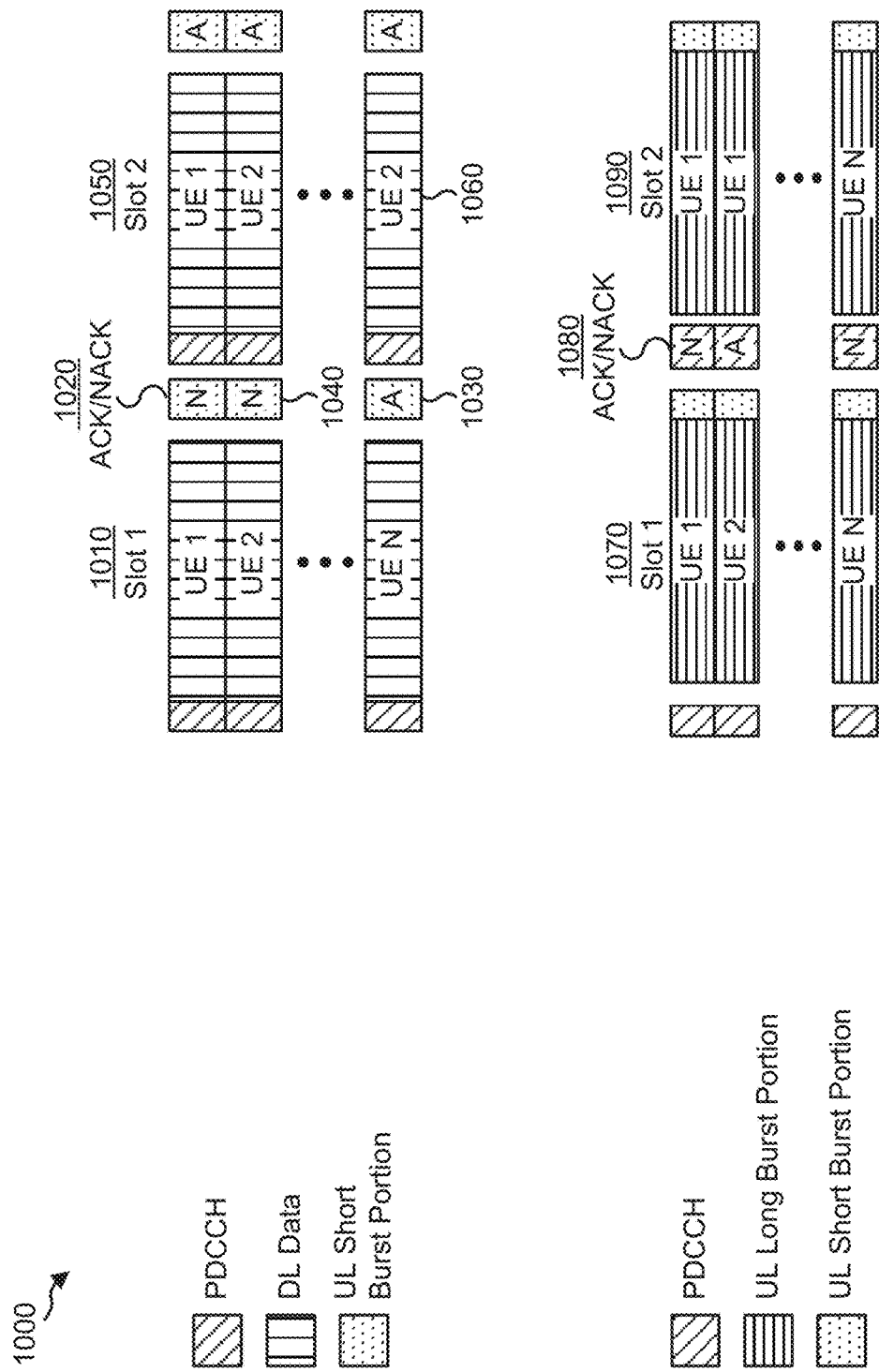
FIG. 10 is a diagram illustrating examples of uplink and downlink communication structures for opportunistic retransmission of mission-critical communications, in accordance with various aspects of the present disclosure.

FIG. 10 is a diagram illustrating examples 1000 of uplink and downlink communication structures for opportunistic retransmission of mission-critical communications, in accordance with various aspects of the present disclosure.

In FIG. 10, a downlink resource allocation technique is described in connection with reference numbers 1010-1060. As can be seen, the downlink resource allocation technique may use the DL-centric subframe structure described in connection with FIG. 5, above. Furthermore, an uplink resource allocation technique is described in connection with reference numbers 1070-1090. As can also be seen, the uplink resource allocation technique may use the UL-centric subframe structure described in connection with FIG. 6, above.

As shown, UEs 1 through N (e.g., UEs 120) may receive first communications in a downlink data portion of a first slot 1010. In FIG. 10, a particular UE (e.g., UE 1) receives or transmits a communication in a resource in which the name of the particular UE is shown. For example, UE 1, UE 2, and UE N each receives a communication in the first slot 1010 (e.g., the names of UEs 1, 2, and N are shown in the downlink data portions of the first slot 1010).

As shown by reference number 1020, UEs 1 through N may provide ACKs or NACKs regarding the first communications in the uplink short burst portion of the DL-centric subframe. By providing the ACKs or NACKs 1020, the UEs 1 through N may enable opportunistic reassignment of the resources of the second slot (e.g., second slot 1050, described below) for retransmission of unsuccessful first communications, as described below. As used herein, a NACK may refer to an explicit NACK where the UE transmits a NACK signal that successfully arrives at the BS 110, or alternatively to an implicit NACK where the BS 110 simply does not receive any ACK or NACK from the BS 110 in a defined period of time (e.g., irrespective of whether the UE attempted to transmit an ACK or NACK).

As shown by reference number 1030, the UE N provides an ACK (shown as A) for the first communication of the UE N. This may mean that the UE N successfully decoded the first communication. As shown by reference number 1040, the UEs 1 and 2 provide a NACK (shown as N, which may correspond to either an explicit NACK or an implicit NACK) for the first communications of the UE 1 and the UE 2. In some aspects, a UE may provide additional information with an ACK or NACK, such as updated channel state information, a desired modulation and coding scheme (MCS) for a second communication, or other information.

FIG. 10 describes a time division duplexing (TDD) implementation of the opportunistic reallocation techniques described herein. In some aspects, the opportunistic reallocation techniques described herein can be implemented using FDD. For example, in FDD, a UE may provide an ACK or NACK in an allocated ACK/NACK uplink or downlink resource.

As shown, UEs 1 and 2 may perform second communications in a second slot 1050. For example, the UEs 1 and 2 may be assigned their respective resources based at least in part on persistent resource allocations of the UEs 1 and 2.

As shown by reference number 1060, a resource that would otherwise be assigned to the UE N based at least in part on a persistent resource allocation of the UE N may be assigned to the UE 2. For example, the resource may be assigned to the UE 2 since the UE 2 was not successful in decoding the first communication (e.g., based at least in part on the NACK shown in connection with reference number 1040). The UE 2 may receive a second communication in the resource. For example, the second communication may include a partial or complete retransmission of the first communication, and/or may include other information. As further shown, the UEs 1 and 2 provide ACKs for the second communications, meaning that decoding of the second communications is successful. In this way, resilience of, for example, mission-critical traffic is improved.

As further shown, on the uplink, UEs 1 through N may transmit a first communication in a first slot 1070. A scheduling entity (e.g., a BS 110, a UE 120, a PLC, or a similar device) may provide an ACK or a NACK for the first communications of the UEs 1 through N in a downlink resource, such as a PDCCH. Here, the UEs 1 and N receive NACKs and the UE 2 receives an ACK.

As further shown, in a second slot 1090, a resource or channel previously used for the UE 2 may be allocated for the UE 1. For example, the scheduling entity may provide scheduling information in the PDCCH shown by reference number 1080 when the scheduling entity provides the ACK or NACK. The UE 1 may transmit a second communication (e.g., a partial or complete retransmission of the first communication and/or other information) using a persistent resource allocation of the UE 1 and a resource previously allocated for the UE 2 in the second slot 1090. In this way, a resource of a persistent resource allocation of the UE 2 is opportunistically reassigned for the UE 1, which improves reliability and coverage of the UEs 1 through N.

While the techniques described in connection with FIG. 10 are described with reference to two consecutive slots and three UEs, the techniques described herein are not so limited. For example, the techniques and apparatuses described herein can be applied with regard to any number of UEs (e.g., tens of UEs, hundreds of UEs, etc.) and over any length of time and/or any number of slots.

In this way, a combination of persistent resource allocation for predictable communications and opportunistic reassignment of resources of the persistent resource allocation is performed. This may provide an advantage over a fixed resource allocation such as a circuit-switched system, since resources that are not needed by one UE can be dynamically reassigned for use by another UE. Furthermore, this may provide an advantage over a purely grant-based system, since downlink grant information (e.g., PDCCH) inherently uses significant overhead and may not achieve desired reliability levels. For example, by using PDCCH signaling only for re-allocation, and not for initial allocation or other control signaling, resources may be saved and reliability may be improved. Furthermore, the techniques and apparatuses described herein may be useful for cyclic traffic associated with relatively small payloads (e.g., approximately 50 to 300 bytes), such as mission-critical traffic for factory automation, although the techniques and apparatuses described herein are not necessarily limited to such an implementation.

In FIG. 10, a separate PDCCH is sent for each UE that NACKs the first communication from slot 1 in order to reassign a persistent resource for the second communication in slot 2 from another UE that ACKed the first communication from slot 1. For example, UE N ACKs (1030) the first communication in the first slot, after which a PDCCH is sent which reassigns UE N's resource to UE 2 for the second communication (1060) in slot 2. Each PDCCH carries a Downlink Control Indicator (DCI) that can have 40+ bits. To achieve a high reliability (e.g., 10e-5), the DCI in each PDCCH may further include a high number of Cyclic Redundancy Check (CRC) bits (e.g., 24 CRC bits per each 40 bit DCI) and a higher Aggregation Level (AL) (e.g., in LTE, AL 8 may be used for the PDCCHs, out of available ALs of 1, 2, 4 and 8, whereby the AL indicates the number of required Control Channel Elements (CCEs) for the PDCCH DCI).

In an example with reference to FIG. 10, assume that N=100 such that there are 100 UEs (e.g., S/As). The first communication in slot 1 is based on previously established SPS-based resource assignment, such that there is no PDCCH constraint for the first communication in slot 1. Now, assume that 90 UEs ACK the first communication in slot 1, while 10 UEs NACK the first communication in slot 1. The 10 UEs that NACK the first communication in slot 1 require retransmission of their respective communications in slot 2, such that 10 PDCCHs are transmitted to these 10 UEs, requiring a total of 400+ bits (out of which 240 bits are CRC bits). In particular, if each PDCCH requires AL 8 for higher reliability, the number of resource blocks (RBs) can be 8*(40+24)*10/12=427, which may exceed PDCCH capacity.

Accordingly, embodiments of the disclosure are further directed to a Group PDCCH (G-PDCCH) for more efficient reassignment of downlink SPS-based resources.

Figure 11:
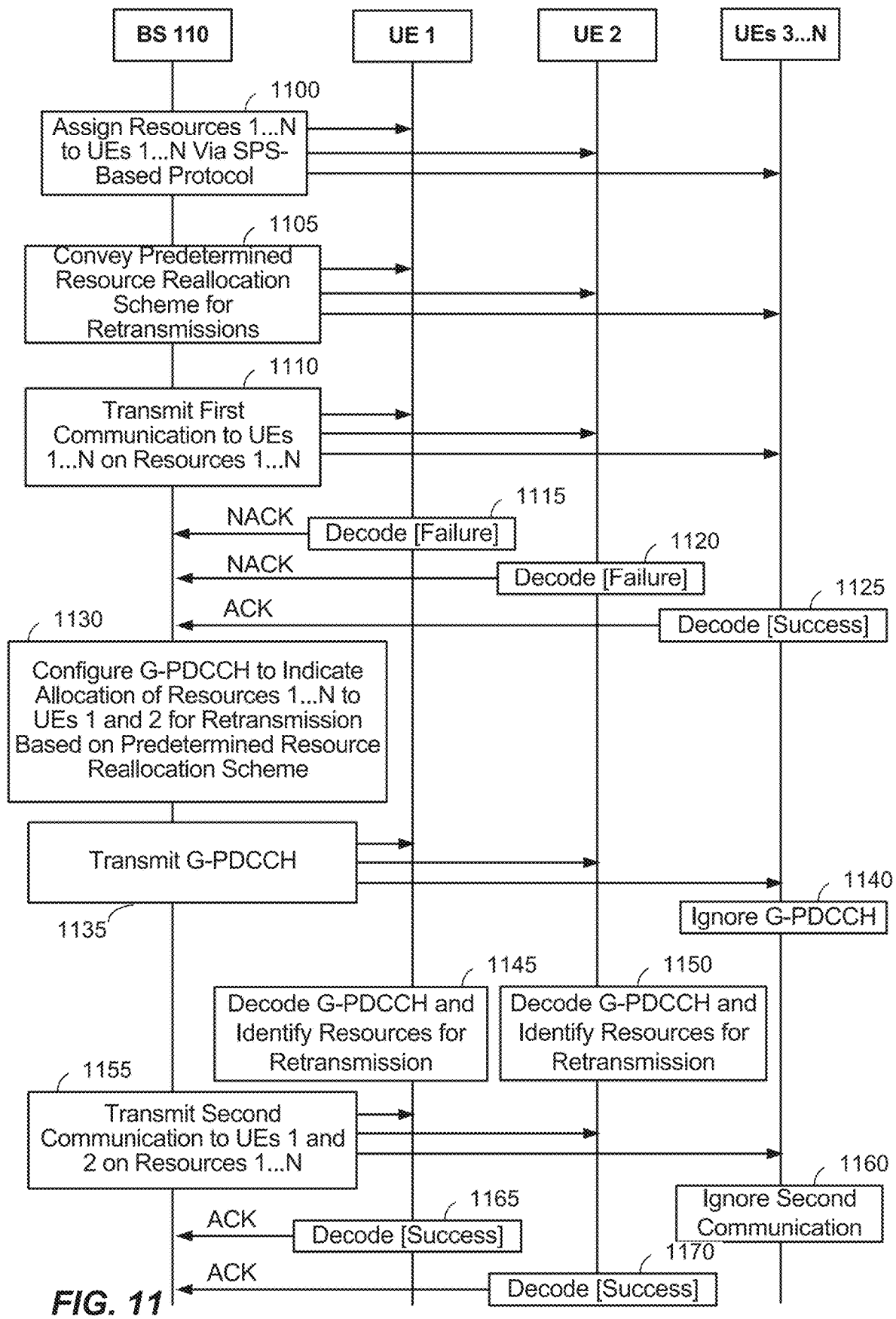
FIG. 11 illustrates an example of opportunistic retransmission in accordance with various aspects of the present disclosure.

FIG. 11 illustrates an example of opportunistic retransmission in accordance with various aspects of the present disclosure. In FIG. 11, reference is made to BS 110 and UEs 1 . . . N. In an example, the BS 110 may correspond to a PLC (e.g., a gNB) and each of the UEs 1 . . . N may correspond to an S/A.

Referring to FIG. 11, at block 1100, BS 110 assigns resources 1 . . . N to UEs 1 . . . N, respectively, via an SPS-based protocol. Accordingly, resources 1 . . . N are assigned to UEs 1 . . . N as persistent resources. As an example, each assigned resource among resources 1 . . . N may correspond to a resource block (RB).

At block 1105, the BS 110 conveys at least one resource reallocation scheme for retransmissions to each of UEs 1 . . . N. Each resource reallocation scheme permits each of UEs 1 . . . N to identify how resources 1 . . . N are distributed among a subset of the UEs 1 . . . N for a communication retransmission based on information contained in a G-PDCCH, as will be described in more detail below. In an example, the at least one resource reallocation scheme may include a single resource reallocation scheme or multiple resource reallocation schemes. If multiple resource reallocation schemes are provided, the G-PDCCH may identify a particular one of the multiple resource reallocation schemes to be used. Various examples of resource reallocation schemes are described below in more detail.

At block 1110, the BS 110 transmits a first communication to UEs 1 . . . N on resources 1 . . . N, respectively. In an example, the transmission at block 1110 may occur without the use of a PDCCH based on the persistent scheduling of these particular resources. In a further example, for a TDD implementation, the first communications may be transmitted in a first slot, such as first slot 1010 in FIG. 10. Further, the first communications to the respective UEs may include the same data or different data.

Referring to FIG. 11, UEs 1 and 2 fail to successfully decode their respective first communications, such that UEs 1 and 2 each transmit a NACK to the BS 110 at blocks 1115-1120. By contrast, UEs 3 . . . N each successfully decode their respective first communications, such that UEs 3 . . . N each transmit an ACK to the BS 110 at block 1125.

At block 1130, the BS 110 configures a G-PDCCH to indicate an allocation of resources 1 . . . N to UEs 1 and 2 for retransmission of the first communications to UEs 1 and 2 based on one of the resource reallocation schemes from block 1105. Because the resource reallocation scheme(s) are coordinated in advance of the G-PDCCH transmission, the resource reallocation scheme(s) may be characterized as "predetermined" resource reallocation scheme(s). If only one predetermined resource reallocation scheme is established at block 1105, the predetermined resource reallocation scheme need not be expressly identified in the G-PDCCH. However, if multiple resource reallocation schemes are established at block 1105, a particular resource reallocation scheme may be identified by the G-PDCCH.

In an example, the G-PDCCH may include a single DCI with a single set of CRC bits, in contrast to the UE-specific PDCCHs described above with respect to FIG. 10 whereby each target UE for the PDCCH includes a separate DCI (e.g., 24 CRC bits per DCI). Assuming 24 CRC bits per DCI, sending two PDCCHs to UEs 1 and 2 requires 48 bits in accordance with FIG. 10, whereas a G-PDCCH only requires 24 CRC bits.

It will be further appreciated that the CRC bit savings associated with the G-PDCCH will scale with the number of UEs that NACK the first communication. For example, consider a deployment whereby there are 100 total UEs (N=100), with 95 UEs ACKing the first communication and 5 UEs NACKing the first communication. Using Binary Phase Shift Keying (BPSK), each UE ID requires 7 bits. The G-PDCCH DCI payload=5×7+24[CRC]=59 bits. Assuming AL=8, the G-PDCCH size=8×59=472 resource elements (REs). By contrast, the total separate NR PDCCH size for sending 5 separate PDCCHs is (40[DCI]+24[CRC]) *5*8=2560 REs.

Returning to FIG. 11, the G-PDCCH is then transmitted at block 1135 (e.g., at a beginning of a second slot for a TDD implementation, such as the second slot 1050 in FIG. 10).

At block 1140, UEs 3 . . . N simply ignore the G-PDCCH because the UEs 3 . . . N already successfully decoded their respective first communications at block 1125. By contrast, at blocks 1145-1150, UEs 1 and 2 each decode the G-PDCCH and identify the resources to be used for retransmission. As will be described below in more detail, the identification of the retransmission resources at blocks 1145-1150 is based on the predetermined resource reallocation scheme(s) established earlier at block 1105.

At block 1155, the BS 110 transmits a second communication to UEs 1 and 2 on resources 1 . . . N, respectively. In particular, the second communications transmitted to UEs 1 and 2 at block 1155 are retransmissions of the first communications transmitted to UEs 1 and 22 at block 1110. The distribution of the resources 1 . . . N allocated between UEs 1 and 2 is mapped in accordance with one of the predetermined resource reallocation scheme(s) established at block 1105 as indicated by the G-PDCCH at block 1130. Further, the second communications to the respective UEs 1 and 2 may include the same data or different data.

At block 1160, UEs 3 . . . N simply ignore the transmission of block 1155 because the UEs 3 . . . N already successfully decoded their respective first communications at block 1125. By contrast, at blocks 1155, UEs 1 and 2 each successfully decode their respective second communications, such that UEs 1 and 2 each transmit an ACK to the BS 110 at blocks 1165 and 1170.

Examples of resource reallocation schemes for the second communication transmissions are shown in Table 3 (below):

TABLE 3

Example Resource Reallocation Schemes

| # | Resource Reallocation Scheme |
|---|---|
| 1 | Distribute Resources in Proportion to the Number of UEs Listed in the G-PDCCH and in the Order in Which the UE ids are Listed |
| 2 | Distribute Resources in Proportion to the Number of UEs Listed in the G-PDCCH and in the Reverse Order in Which the UEs are Listed |
| 3 | Distribute Half of All Resources to First Listed UE in the G-PDCCH, and then Distribute the Remaining Resources in Proportion to the Remaining Number of UEs Listed in the G-PDCCH and in the Order in Which the UEs are Listed |

Referring to Table 3, assume the following:
There are 100 total UEs (N=100), with 95 UEs ACKing the first communication and 5 UEs NACKing the first communication;
Each of UEs 1 . . . 100 is persistently assigned RB rows 1 . . . N for the transmission of the first communications;
UEs 3, 12, 56, 78 and 92 assigned to RB rows 3, 12, 56, 78 and 92 for the first communication are the 5 UEs NACKing the first communication; and
The NACKing UEs are listed in the G-PDCCH in the order of [92, 78, 12, 3, 56]. More specifically, UE IDs (e.g., 7 bit IDs for BPSK) for these respective UEs are listed in the indicated order.

Under these assumptions, resource reallocation scheme #1 assigns, for the second communication, RB rows 1 . . . 20 to UE 92, RB rows 21 . . . 40 to UE 78, RB rows 41 . . . 60 to UE 12, RB rows 61 . . . 80 to UE 3, and RB rows 81 . . . 100 to UE 56, i.e., in proportion to the total available RB rows in the listed UE order from the G-PDCCH.

Under these assumptions, resource reallocation scheme #2 assigns, for the second communication, RB rows 1 . . . 20 to UE 56, RB rows 21 . . . 40 to UE 3, RB rows 41 . . . 60 to UE 12, RB rows 61 . . . 80 to UE 78, and RB rows 81 . . . 100 to UE 92, i.e., in proportion to the total available RB rows in the reverse of the listed UE order from the G-PDCCH.

Under these assumptions, resource reallocation scheme #3 assigns, for the second communication, RB rows 1 . . . 50 to UE 92 based on the increased priority allocated to the first-listed UE. Then, resource reallocation scheme #3 assigns RB rows 51 . . . 62 to UE 78, RB rows 63 . . . 74 to UE 12, RB rows 75 . . . 86 to UE 3, and RB rows 87 . . . 100 to UE 56, i.e., half of the RB rows to the first-listed UE, with the remaining RB rows allocated in proportion to the total available RB rows in the listed UE order from the G-PDCCH. Also, any RB row remainder goes to the last-listed UE in this example, although the RB row remainder can be handled in other ways in accordance with other implementations of resource reallocation scheme #3 (e.g., tacked onto the RB rows allocated to the first-listed UE so that UE 92 is assigned RB rows 1 . . . 52 with the remaining UEs being assigned an even 12 RB rows each, etc.).

In an example, it is possible for two or more of the resource reallocation schemes to be coordinated between the BS 110 and UEs 1 . . . N in FIG. 11. In this case, each of the two or more resource reallocation schemes may be indexed to a unique resource reallocation scheme identifier. The G-PDCCH may then be configured with a field containing the resource reallocation scheme identifier that identifies the resource reallocation scheme to be used in the transmission of the second communications to ensure that each target UE tunes to the correct resources.

For implementations where the G-PDCCH is required to include the UE IDs of each UE being assigned resources for transmission of the second communications (e.g., as in resource reallocation schemes #1-#3 in Table 3 above), it will be appreciated that the size of the G-PDCCH is variable and scales with the number of UE IDs to be included in the G-PDCCH. However, in certain implementations, the UEs may need to know the G-PDCCH size in advance to properly decode the G-PDCCH. Various mechanisms can be implemented to convey the G-PDCCH size to the UEs in advance of the G-PDCCH transmission, such as any of the following:

Transmit signaling after receiving the ACKs/NACKs from the UEs (e.g., after the BS 110 knows how many UE IDs need to be included in the G-PDCCH) and before the G-PDCCH transmission that indicates the G-PDCCH size. For example, this signaling may be communicated via common signaling; or Configure the G-PDCCH with a fixed size that is determined by an assumed worst-case scenario. For example, for a given total number of UEs (e.g., 100) and a target Block Error Rate (BLER) for the first communication transmissions, the fixed size can be configured to accommodate a number of UEs requiring retransmission at a tail distribution (e.g., 10e-5). In this case, the G-PDCCH size is configured as a balance between overhead efficiency and being able to accommodate all the UEs that NACK the first communication transmissions for most scenarios.

Figure 12:
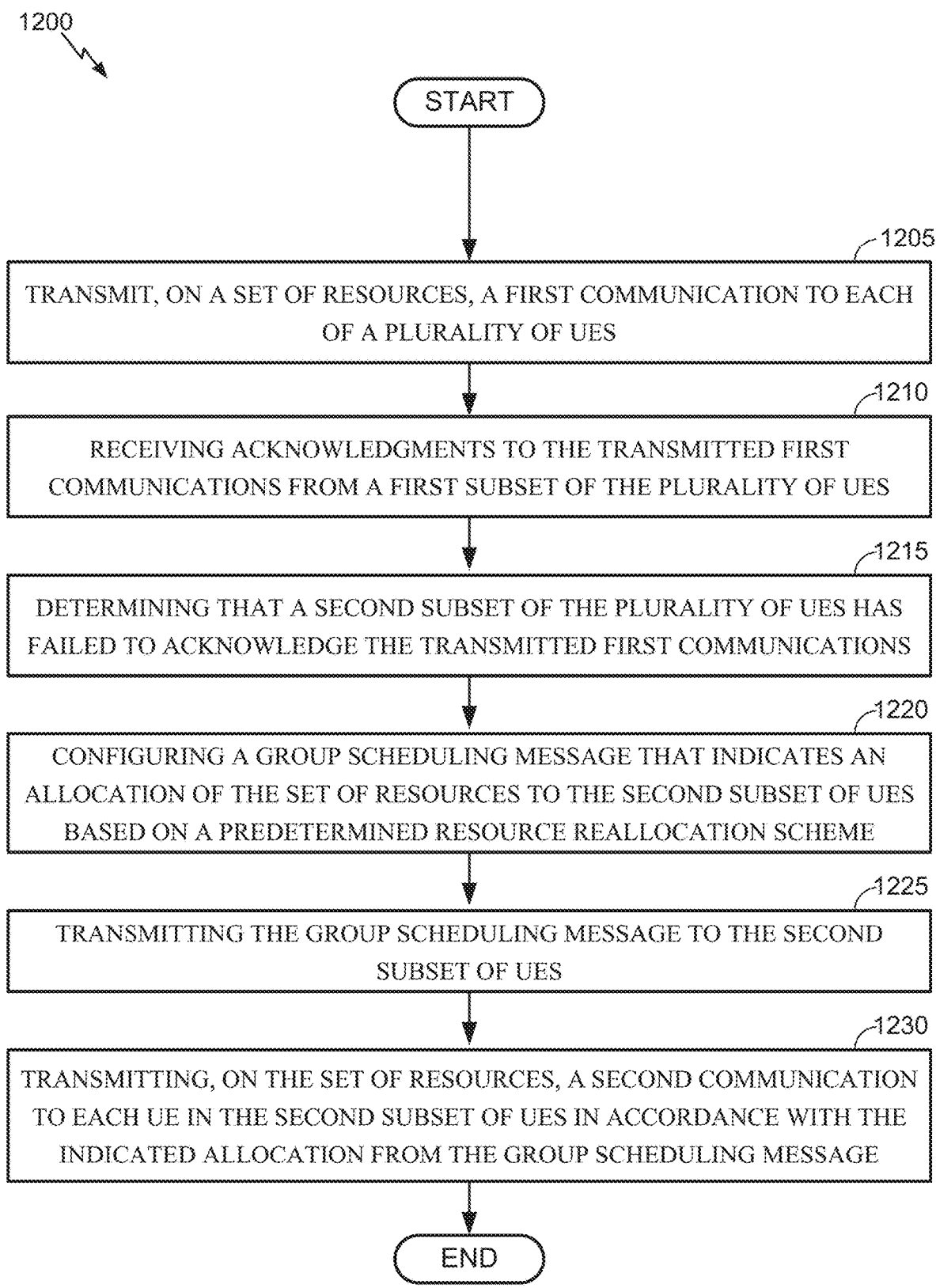
FIGS. 12 and 13 illustrate opportunistic retransmission procedures in accordance with embodiments of the disclosure.
Figure 13:
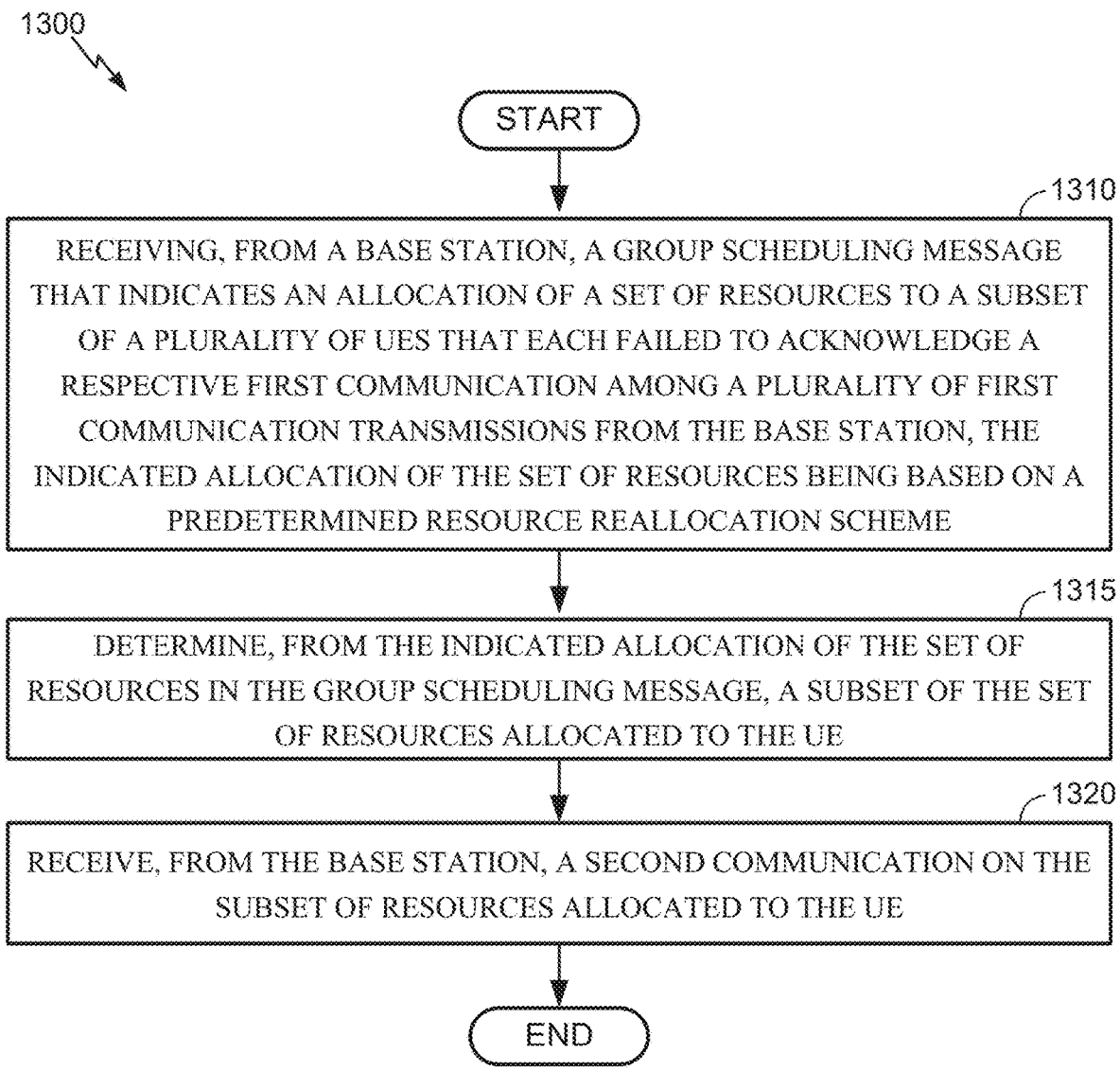

FIGS. 12 and 13 illustrate opportunistic retransmission procedures 1200 and 1300 in accordance with embodiments of the disclosure. In an example, the opportunistic retransmission procedure 1200 of FIG. 12 is performed by a BS, such as BS 110 (e.g., a gNB, PLC, TRP, etc.), whereas the opportunistic retransmission procedure 1200 of FIG. 12 is performed by a UE, such as UE 120, S/A, etc.). In particular, the BS performing the process of FIG. 12 may correspond to the BS 110 in the process of FIG. 11, and the UE performing the process of FIG. 13 may correspond to UE 1 or UE 2 in the process of FIG. 11.

Referring to FIG. 12, at block 1205, the BS transmits, on a set of resources, a first communication to each of a plurality of UEs. For example, the set of resources may correspond to a group of resource blocks or resource elements on a downlink channel, as in block 1110 of FIG. 11. At block 1210, the BS receives ACKs to the transmitted first communications from a first subset of the plurality of UEs (e.g., UEs 3 . . . N at block 1125 of FIG. 11). At block 1215, the BS determines that a second subset of the plurality of UEs (e.g., UEs 1 and 2 at blocks 1115-1120 of FIG. 11) has failed to acknowledge the transmitted first communications (e.g., based on receipt of express NACKs and/or by interpreting a failure to respond to the transmitted first communications as an implicit NACK). At block 1220, the BS configures a group scheduling message that indicates an allocation of the set of resources to the second subset of UEs based on a predetermined resource reallocation scheme (e.g., as in block 1130 of FIG. 11). At block 1225, the BS transmits the group scheduling message to the second subset of UEs (e.g., as in block 1135 of FIG. 11). At block 1230, the BS transmits, on the set of resources, a second communication to each UE in the second subset of UEs in accordance with the indicated allocation from the group scheduling message (e.g., as in block 1155 of FIG. 11).

At block 1310, the UE receives, from the BS, a group scheduling message that indicates an allocation of a set of resources to a subset of a plurality of UEs that each failed to acknowledge a respective first communication among a plurality of first communication transmissions from the base station, the indicated allocation of the set of resources being based on a predetermined resource reallocation scheme (e.g., the transmission from block 1225 of FIG. 12). At block 1315, the UE determines, from the indicated allocation of the set of resources in the group scheduling message, a subset of the set of resources allocated to the UE (e.g., one of the transmissions from block 1230 of FIG. 12). At block 1320, the UE receives, from the BS, a second communication on the subset of resources allocated to the UE (e.g., one of the transmissions from block 1230 of FIG. 12).

In an example, the failure of the plurality of UEs (including the UE performing the process of FIG. 13) to acknowledge their respective first communication can occur in different ways. For example, a UE may fail to acknowledge its respective first communication by successfully transmitting an explicit NACK from the UE to the base station, or by failing to successfully transmit either a NACK or an ACK from the UE to the base station (i.e., an implicit NACK). Moreover, an implicit NACK may occur based on a failure on the downlink side (e.g., the first communication fails to reach the UE at all) or the uplink side (e.g., the first communication reaches the UE, but the UE's ACK or NACK to the first communication fails to reach the BS).

It will be appreciated that the process 1100 of FIG. 11 represents an example implementation of the processes 1200-1300 in FIGS. 12-13. The NACKs received at the BS in FIG. 12 and/or conveyed by the UE in FIG. 13 may include at least one explicit NACK, at least one implicit NACK, or a combination thereof. The processes 1200-1300 of FIGS. 12-13 may be preceded by negotiation or establishment of one or more resource reallocation schemes, for example, as described with respect to block 1105 of FIG. 11. If multiple resource reallocation schemes, the group scheduling message (e.g., G-PDCCH) may include a field that identifies the predetermined resource reallocation scheme. The group scheduling message (e.g., G-PDCCH) may include a UE ID of each UE that NACKs the first communication, and the predetermined resource reallocation scheme may allocate the set of resources between the subset of UEs that NACK the first communication based at least in part upon an order in which the UE IDs are listed in the group scheduling message. The group scheduling message may be configured with a fixed size, or alternatively may have a variable size that scales with the number of UEs that NACK the first communication, with the variable size being conveyed from the BS to the UE before the group scheduling message (e.g., G-PDCCH) is transmitted.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of operating a base station of a communications network, comprising:
    transmitting, on a set of resources, a first communication to each of a plurality of user equipments (UEs);
    receiving acknowledgments (ACKs) to the transmitted first communications from a first subset of the plurality of UEs;
    determining that a second subset of the plurality of UEs has failed to acknowledge the transmitted first communications;
    configuring a group scheduling message that indicates an allocation of the set of resources to the second subset of UEs based on a predetermined resource reallocation scheme;
    transmitting the group scheduling message to the second subset of UEs; and
    transmitting, on the set of resources, a second communication to each UE in the second subset of UEs in accordance with the indicated allocation from the group scheduling message,
    wherein at least one resource of the set of resources associated with transmission of a respective transmitted first communication to a first respective UE among the first subset of UEs is associated with transmission of a respective transmitted second communication to a second respective UE among the second subset of UEs, and
    wherein one or more resources from the set of resources associated with transmission of a respective transmitted first communication to the second respective UE is also associated with transmission of the respective transmitted second communication to the second respective UE.

2. The method of claim 1,
    wherein the base station is a gNB,
    wherein the group scheduling message is a group Physical Downlink Control Channel (G-PDCCH), and
    wherein the plurality of UEs correspond to a plurality of sensor/actuators (S/As).

3. The method of claim 1, wherein the determining is based on receipt of at least one explicit NACK, interpreting a failure to respond to the transmitted first communications as at least one implicit NACK, or a combination thereof.

4. The method of claim 1, further comprising:
    conveying, in advance of the transmission of the first communications, one or more resource reallocation schemes to the plurality of UEs,
    wherein the predetermined resource reallocation scheme used to identify the allocation of the set of resources in the group scheduling message corresponds to one of the one or more resource reallocation schemes.

5. The method of claim 4,
    wherein the one or more resource reallocation schemes include multiple resource reallocation schemes, and
    wherein the group scheduling message includes a field that identifies the predetermined resource reallocation scheme.

6. The method of claim 1, wherein a UE identifier (ID) of each UE in the second subset of UEs is listed in the group scheduling message.

7. The method of claim 6, wherein the predetermined resource reallocation scheme allocates the set of resources between the UEs in the second subset of UEs based at least in part upon an order in which the UE IDs are listed in the group scheduling message.

8. The method of claim 1, wherein the group scheduling message is preconfigured with a fixed size irrespective of a number of UEs in the second subset of UEs.

9. The method of claim 1, wherein a size of the group scheduling message is variable and scales with a number of UEs in the second subset of UEs, further comprising:
    transmitting, before the transmission of the second communications, an indication of the size of the group scheduling message to each UE in the second subset of UEs.

10. A method of operating a user equipment (UE) of a communications network, comprising:
    receiving, from a base station, a group scheduling message that indicates an allocation of a set of resources to a subset of a plurality of UEs that each failed to acknowledge a respective first communication among a plurality of first communication transmissions from the base station, the indicated allocation of the set of resources being based on a predetermined resource reallocation scheme;
    determining, from the indicated allocation of the set of resources in the group scheduling message, a subset of the set of resources allocated to the UE; and
    receiving, from the base station, a second communication on the subset of resources allocated to the UE,
    wherein at least one resource of the subset of resources allocated to the UE is associated with an acknowledged first communication of another one of the plurality of UEs, and
    wherein at least one other resource of the subset of resources allocated to the UE is associated with the respective first communication that the UE failed to acknowledge.

11. The method of claim 10,
    wherein the base station is a gNB,
    wherein the group scheduling message is a group Physical Downlink Control Channel (G-PDCCH), and
    wherein UE is a sensor/actuator (S/A).

12. The method of claim 10, wherein the plurality of UEs each fail to acknowledge the respective first communication by successfully transmitting an explicit NACK from the UE to the base station, or by failing to successfully transmit either a NACK or an ACK from the UE to the base station.

13. The method of claim 10, further comprising:
    receiving one or more resource reallocation schemes from the base station,
    wherein the predetermined resource reallocation scheme used to identify the allocation of the set of resources in the group scheduling message corresponds to one of the one or more resource reallocation schemes.

14. The method of claim 13,
    wherein the one or more resource reallocation schemes include multiple resource reallocation schemes, and
    wherein the group scheduling message includes a field that identifies the predetermined resource reallocation scheme.

15. The method of claim 10, wherein a UE identifier (ID) of each UE in the subset of UEs is listed in the group scheduling message.

16. The method of claim 15, wherein the predetermined resource reallocation scheme allocates the set of resources between the UEs in the subset of UEs based at least in part upon an order in which the UE IDs are listed in the group scheduling message.

17. The method of claim 10, wherein the group scheduling message is preconfigured with a fixed size irrespective of a number of UEs in the subset of UEs.

18. The method of claim 10, wherein a size of the group scheduling message is variable and scales with a number of UEs in the subset of UEs, further comprising:
receiving, from the base station before the receiving of the second communication, an indication of the size of the group scheduling message.

19. A base station of a communications network, comprising:
a memory; and
at least one processor coupled to at least one transceiver and the memory and configured to:
transmit, on a set of resources, a first communication to each of a plurality of user equipments (UEs);
receive acknowledgments (ACKs) to the transmitted first communications from a first subset of the plurality of UEs;
determine that a second subset of the plurality of UEs has failed to acknowledge the transmitted first communications;
configure a group scheduling message that indicates an allocation of the set of resources to the second subset of UEs based on a predetermined resource reallocation scheme;
transmit the group scheduling message to the second subset of UEs; and
transmit, on the set of resources, a second communication to each UE in the second subset of UEs in accordance with the indicated allocation from the group scheduling message,
wherein at least one resource of the set of resources associated with transmission of a respective transmitted first communication to a first respective UE among the first subset of UEs is associated with transmission of a respective transmitted second communication to a second respective UE among the second subset of UEs, and
wherein one or more resources from the set of resources associated with transmission of a respective transmitted first communication to the second respective UE is also associated with transmission of the respective transmitted second communication to the second respective UE.

20. The base station of claim 19,
wherein the base station is a gNB,
wherein the group scheduling message is a group Physical Downlink Control Channel (G-PDCCH), and
wherein the plurality of UEs correspond to a plurality of sensor/actuators (S/As).

21. The base station of claim 19,
wherein the at least one processor is further configured to convey, in advance of the transmission of the first communications, one or more resource reallocation schemes to the plurality of UEs, and
wherein the predetermined resource reallocation scheme used to identify the allocation of the set of resources in the group scheduling message corresponds to one of the one or more resource reallocation schemes.

22. A user equipment (UE) of a communications network, comprising:
a memory; and
at least one processor coupled to at least one transceiver and the memory and configured to:
receive, from a base station, a group scheduling message that indicates an allocation of a set of resources to a subset of a plurality of UEs that each failed to acknowledge a respective first communication among a plurality of first communication transmissions from the base station, the indicated allocation of the set of resources being based on a predetermined resource reallocation scheme;
determine, from the indicated allocation of the set of resources in the group scheduling message, a subset of the set of resources allocated to the UE; and
receive, from the base station, a second communication on the subset of resources allocated to the UE,
wherein at least one resource of the subset of resources allocated to the UE is associated with an acknowledged first communication of another one of the plurality of UEs, and
wherein at least one other resource of the subset of resources allocated to the UE is associated with the respective first communication that the UE failed to acknowledge.

23. The UE of claim 22,
wherein the base station is a gNB,
wherein the group scheduling message is a group Physical Downlink Control Channel (G-PDCCH), and
wherein UE is a sensor/actuator (S/A).

24. The UE of claim 22, wherein the plurality of UEs each fail to acknowledge the respective first communication by successfully transmitting an explicit NACK from the UE to the base station, or by failing to successfully transmit either a NACK or an ACK from the UE to the base station.

25. The UE of claim 22,
wherein the at least one processor is further configured to receive one or more resource reallocation schemes from the base station, and
wherein the predetermined resource reallocation scheme used to identify the allocation of the set of resources in the group scheduling message corresponds to one of the one or more resource reallocation schemes.

26. The UE of claim 22,
wherein the one or more resource reallocation schemes include multiple resource reallocation schemes, and
wherein the group scheduling message includes a field that identifies the predetermined resource reallocation scheme.

27. The UE of claim 22, wherein a UE identifier (ID) of each UE in the subset of UEs is listed in the group scheduling message.

28. The UE of claim 22, wherein the predetermined resource reallocation scheme allocates the set of resources between the UEs in the subset of UEs based at least in part upon an order in which the UE IDs are listed in the group scheduling message.

29. The UE of claim 22, wherein the group scheduling message is preconfigured with a fixed size irrespective of a number of UEs in the subset of UEs.

30. The UE of claim 22,
wherein a size of the group scheduling message is variable and scales with a number of UEs in the subset of UEs, and wherein the at least one processor is further configured to:
receive, from the base station before the receiving of the second communication, an indication of the size of the group scheduling message.

\* \* \* \* \*